ALBERT HORNER
PAUL E. STORY
INVENTORS

BY

ATTORNEY

ALBERT HORNER
PAUL E. STORY
INVENTORS

BY
ATTORNEY

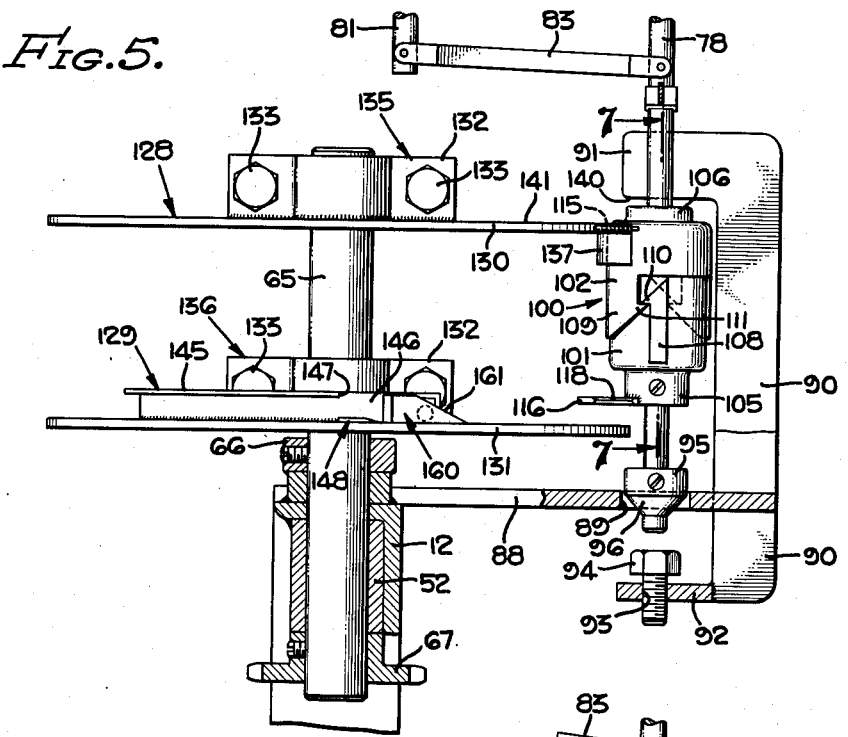

June 16, 1953
A. HORNER ET AL
2,642,184
MECHANICAL WEIGHT CLASSIFIER
Filed Dec. 5, 1950
4 Sheets-Sheet 4
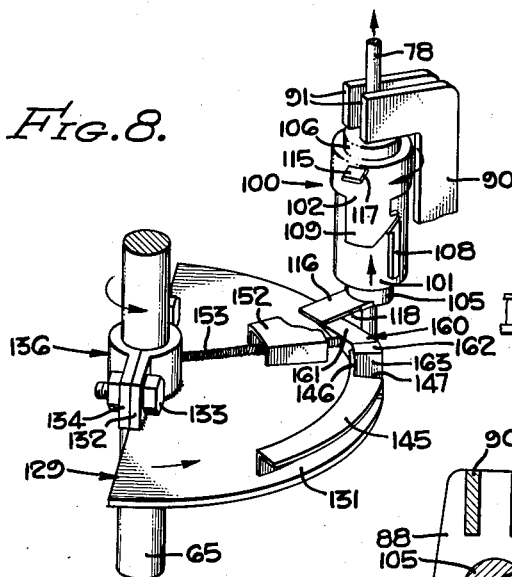
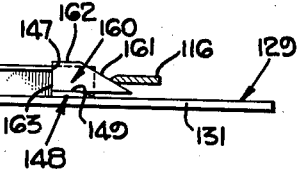
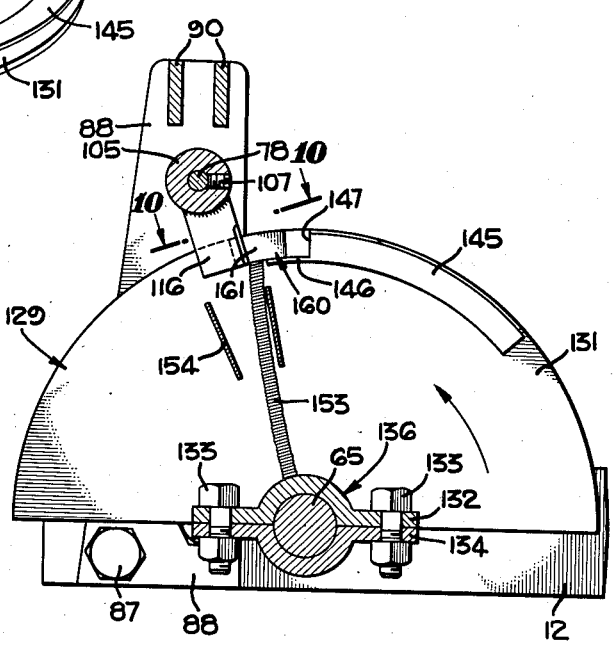
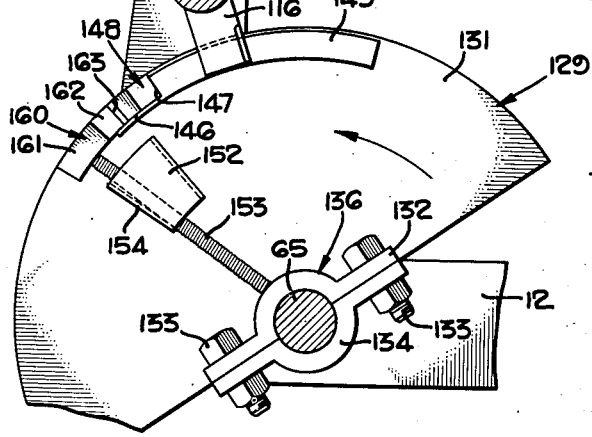
ALBERT HORNER
PAUL E. STORY
INVENTORS
BY
ATTORNEY Patented June 16, 1953

2,642,184

UNITED STATES PATENT OFFICE 2,642,184

MECHANICAL WEIGHT CLASSIFIER

Albert Horner and Paul E. Story, Kapaa, Kauai, Territory of Hawaii, assignors to Hawaiian Canneries Company, Limited, Kapaa, Territory of Hawaii, a corporation of Hawaii Application December 5, 1950, Serial No. 199,176

6 Claims. (Cl. 209—121)

This invention relates to weighing machines and particularly to the classification by weight of articles passing along on a conveyor.

While this invention has many applications and uses, it is particularly adapted for classifying open cans, immediately following the delivery of product to the cans, to ascertain whether or not the weight of product in the can comes between the maximum and minimum tolerance allowable or whether too much or too little material has been delivered to the can. A weight classifier designed particularly for this use is disclosed in the co-pending application for U. S. Letters Patent of Albert Horner, Ser. No. 772,545, filed September 6, 1947. The classifier disclosed therein employs a scale including a counter-balanced platform which occupies a correspondingly shaped vertical opening in a trackway along which cans are pushed by pusher arms of a conveyor. The far edge of said opening is biased so that when the platform is depressed by the weight of a loaded can resting thereon, this can is pushed against the biased edge of said opening and thus deflected from the trackway.

In this former classifier an electric solenoid is energized by a switch whenever the platform is slightly depressed by the weight of a loaded can thereon, the solenoid thereupon depressing the platform against a limit stop thereby assuring that the can on the platform will be deflected from the trackway. Under certain circumstances it is preferable to employ equipment for this purpose which operates mechanically rather than electrically.

It is accordingly an object of this invention to provide a mechanical weight classifier which is not dependent upon electrical equipment for performing the control functions thereof.

A further object of this invention is to provide a novel and improved mechanical weight classifier which is adapted to segregate, by weight the articles in a series of the same being pushed along a trackway by a pusher conveyor.

Another object of the invention is to provide a mechanical weight classifier which is spring actuated.

The manner of accomplishing the foregoing objects as well as further objects and advantages will be made manifest in the following description taken in connection with the accompanying drawings, in which.

Figure 2:
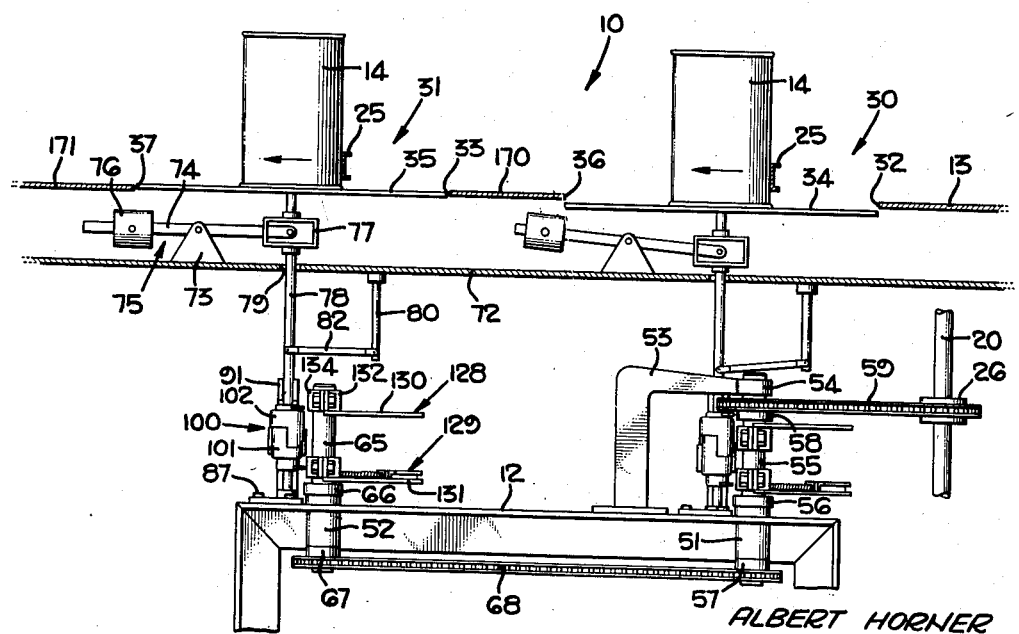
Fig. 2 is an enlarged diagrammatic vertical sectional view taken on the line 2—2 of Fig. 1 and illustrating the two classifier units of the classifier shown in Fig. 1.
Figures 3, 4:
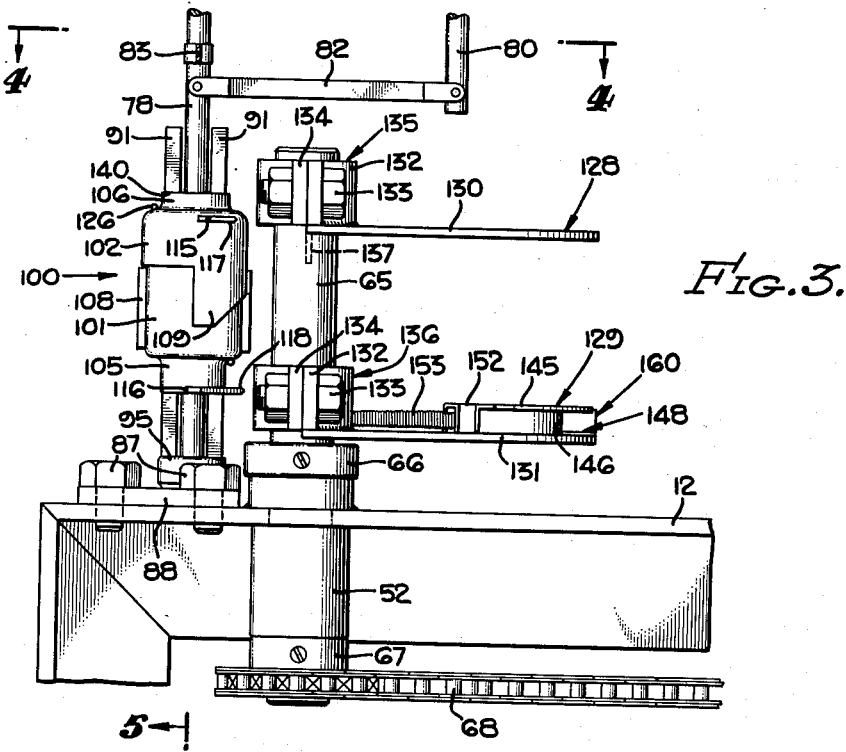

Fig. 3 is an enlarged fragmentary view of the left hand portion of Fig. 2 illustrating one of said classifying units of the invention, with the parts thereof disposed at a time point in one of the recurrent cycles of operation through which the invention continuously passes, at which point a can is being pushed across the platform of said unit and the scales of said unit have had time to respond to the weight of said can with said weight (in this particular instance) being inadequate to depress said platform, whereby the spring device of the invention in its upward position rests against fixed frame shoulders with the trigger at a level to be bypassed by the trigger actuator with the trigger close to the upper surface of said actuator, with cocking arm of the spring device lifted to a level where it will be by-passed by the cocking arm actuator cam with the latter traveling just beneath and out of contact with said arm.

Fig. 4 is a plan view of Fig. 3 taken on the line 4—4 thereof, with the trigger actuator sector plate partially broken away to reveal a portion of the cocking arm actuator sector plate disposed therebelow.

Fig. 5 is a fragmentary elevational view of the unit shown in Fig. 4 taken in the direction of arrow 5 (with the fixed frame structure in section on the line 5—5 of Fig. 4), this view however, showing the spring device cocked and depressed with its shaft as by an overweight can on the platform to lower the trigger below the upper edge of the trigger acutator sector plate so that the trigger will be engaged by said plate and actuated as the power shaft carrying the sector plates continues to rotate.

Fig. 6 is a fragmentary view similar to Fig. 5 and illustrates the spring device in expanded condition to depress the spring device shaft and assure the diversion of said can from said platform, said shaft resting against a stop at its lower end and lowering the cocking arm into the path of the cocking cam on the cocking actuator sector plate, whereby continued rotation of the power shaft advances said cam into engagment with said arm, said cam yielding because of its spring mounting to travel up onto a secondary cam and against a stop on said plate whereupon said arm is lifted by said cam by further advancement of said plate to re-cock said spring device.

Fig. 7 is an enlarged vertical sectional view of the spring device of one of the units of the invention with said device cocked, said view being taken on the line 7—7 of Fig. 5.

Fig. 8 is a fragmentary perspective view of one of the units of the invention illustrating the cocking arm actuator cam of that unit engaging said arm in a position (as shown in Figs. 9 and 10) so that continued movement of the sector plate carrying said cam will cock the spring device of said unit.

Fig. 9 is a fragmentary horizontal sectional view taken on the line 9—9 of Fig. 6 and showing the cocking actuator sector plate and cam advanced to the same point as shown in Fig. 8.

Fig. 10 is a fragmentary detailed sectional view taken on the line 10—10 of Fig. 9 and showing the cocking arm in contact with the cam for actuating the same after said cam has been shifted by said arm on top of the secondary cam and against the stop referred to in describing Fig. 6. From this point onward the horizontal movement of the cocking actuator sector plate propels said cam with it to lift said arm until said cam passes beneath said arm.

Fig. 11 is a view similar to Fig. 9 and illustrates the point in the rotation of the cocking arm actuator where the actuator cam has already passed beneath said arm so as to cock said spring device, said arm in this view being shown as when the guide rail on the periphery of said actuator is disposed close beneath said arm to retain said platform in alignment with said trackway for a short stabilizing period immediately following the cocking operation. This view also shows the actuator cam returned to its advanced position by the spring arm on which it is mounted which occurs immediately upon its traveling out of contact with the cocking arm.

Figure 1:
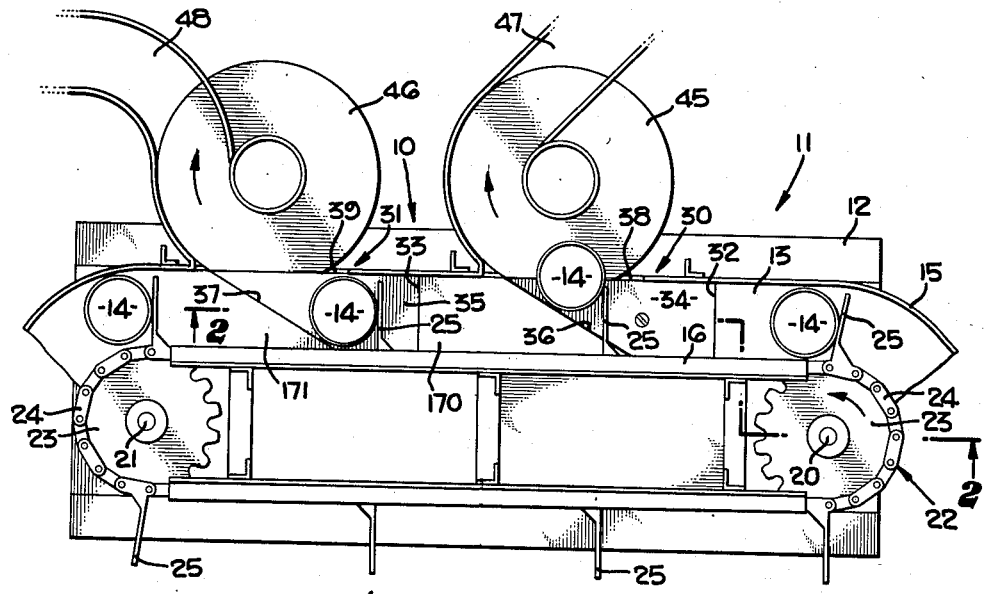
Fig. 1 is a diagrammatic plan view of a can carrying conveyor including a can trackway and a pusher conveyor associated therewith, and with which a preferred embodiment of the mechanical weight classifier of this invention is incorporated.

Referring specifically to the drawings the classifier 10 of our invention is shown in Fig. 1 as incorporated with a can conveyor 11 having a frame 12 providing a trackway 13 adapted to carry cans 14 and having an outer guide rail 15 and an inner guide rail 16. Also mounted on frame 12 are vertical shafts 20 and 21 of a can pusher conveyor 22, these shafts having sprockets 23 about which is trained an endless chain 24 having individual can pushing arms 25. An electric motor (not shown) or other suitable power means is connected to the shaft 21 to rotate this and thus continuously drive the conveyor 22. Shaft 20 also has a sprocket 26, the purpose of which will be made clear hereinafter.

The classifier 10 includes two weighing units 30 and 31 which are identical in structure and mode of operation. The trackway 13 has an opening 32 formed opposite the unit 30 and a similar opening 33 formed therein opposite the unit 31. These openings are for the reception of platforms 34 and 35 which are shaped to fit said openings and slide vertically therein, the leading edges 36 and 37 of said openings lie obliquely across said trackway so that when a can fairly engages either of these biased edges while being pushed along the trackway 13 by one of the pushers 25, it is deflected outwardly off said trackway. There are breaks 38 and 39 in the outer guide wall 15 of the conveyor 11, opposite which rotary transfer discs 45 and 46 are located to receive cans so diverted from the conveyor 11 and to direct them respectively onto conveyors 47 and 48.

Provided on the frame 12 are a pair of vertical bearings 51 and 52, there being an arm 53 having a bearing 54 in alignment with the bearing 51. Journalling in bearings 51 and 54 is a shaft 55 this shaft having a collar 56 just above the bearing 51 and a sprocket 57 just below said bearing. Shaft 55 also has a sprocket 58 which is on the same level as the sprocket 26 and is connected thereto by an endless chain 59. Journalling in bearing 52 is a shaft 65 having a collar 66 and a sprocket 67 located just above and below bearing 52. Sprockets 57 and 67 are on the same level and are connected by an endless chain 68.

Shaft 55 is the power shaft of classifier unit 30. Shaft 65 is the power shaft of classifier unit 31. As these units are identical in structure and mode of operation and as unit 31 alone is illustrated in detail in the drawings, the balance of the detailed description of these two units will be directed to the unit 31 alone, with the understanding that if it is necessary to refer to any part of the unit 30 which is not otherwise identified, use will be made of the reference numeral applied in identifying the corresponding part in unit 31, with prime attached.

Frame 12 includes a deck plate 72 (Fig. 2) having fixed thereon a fulcrum bracket 73 on which a balance beam 74 of a scale 75 is pivoted. The beam 74 carries a counter-balance weight 76 at one end and at its other is pivotally connected with a box 77 provided on a vertical spring device shaft 78. The upper end of this shaft is fastened to and supports the platform 35 and extends freely downwardly through a hole 79 in deck 72. Mounted on the bottom of this deck are inverted posts 80 and 81 which are connected by horizontal links 82 and 83 with the shaft 78 so as to maintain the shaft 78 against rotation and substantially vertical throughout the operation of the device. Fixed to the frame 12 by cap screws 87 is a frame arm 88 having a hole 89 formed therein in substantial vertical alignment with shaft 78 and having a pair of vertical bars 90 extending upwardly and downwardly from the outer end thereof, said bars having horizontal members 91 extending from their upper ends alongside the shaft 78 just below the connection of the link 82 therewith. Extending underneath the hole 89 from lower ends of the bearings 90 is a horizontal plate 92 having a tapped hole 93 for receiving a stop screw 94, this being in alignment with the hole 89.

Fixed on a lower end portion of shaft 78 is a guide collar 95, having a conical lower face 96.

Also mounted on the shaft 78 between collar 95 and the frame members 91 is a spring device 100 comprising lower and upper cups 101 and 102 which are in telescopic relation with each other, the shaft 78 passing concentrically through holes 103 and 104 in the bases 105 and 106 respectively of said cups. However, cup 101 is secured to shaft 78 by a set screw 107 while upper cup 102 is free to rotate about or slide on said shaft.

Cup 101 slides within the cup 102 and has latches 108 fixed on the outer faces thereof in diametrically opposite positions. The lower edge of cup 102 is shaped to form latches 109 thereon meeting latches 108 obliquely, these latches having catches 110 and 111 respectively.

Formed on and extending outwardly from the base 106 of upper cup 102 is a flat horizontal trigger 115. Also extending horizontally from the base 105 of the cup 101 and in substantially the same direction as trigger 115 is a cocking arm 116, trigger 115 and arm 116 having bevelled contact edges 117 and 118 respectively.

Formed in the cup bases 105 and 106 are spring holes 120 and 121 into which ends 122 and 123 of a coil spring 124 extends with this spring trapped within the spring device 100 by the tips 125 and 126 of said spring ends being bent down against the outside of cup bases 105 and 106. The spring device 100 is thus assembled with the spring 124 confined therein with this spring under compression but with the spring also supplying a torque bias which rotates cup 102 to bring the oblique face of latches 109 into contact with corresponding oblique faces of latches 108, as shown in Fig. 6. This torque operates when said cups are telescoped together so that the catch 110 rides past the catch 111 to snap these catches together in interlocking relation as they are shown in Fig. 5. When this happens the device 100 is said to be cocked.

The power shaft 65 of the unit 31 is substantially parallel to and spaced from the shaft 78 as shown in Figs. 4, 8, 9 and 11 with the trigger 115 and cocking arm 116 of the spring unit 100 extending from the latter directly toward the shaft 65. Mounted on the shaft 65 is a trigger actuator 128 and a cocking arm actuator 129 which comprise half discs or sector plates 130 and 131 each of which has a clamp member 132 welded thereto which is united by bolts 133 with a complementary clamp member 134 so as to form clamps 135 and 136 for adjustably fixing the sector plates 130 and 131 on the shaft 65 so that said plates rotate in radial planes normal to the shaft 65.

Trigger actuator 128 has a lug 137 which deepens the outer portion of the leading edge 138 of sector plate 130 where said edge is adapted to contact the trigger 115 for firing the spring device 100. The expansion of unit 100 caused by firing the same, shifts the cup 102 upwardly against lower shoulders 140 of the horizontal frame members 91 (Fig. 6), which elevates the trigger 115 so as to just clear the upper face 141 of the trigger actuator 128.

The sector plate 131 of the cocking arm actuator 129 is disposed at a level so as to always pass beneath the cocking arm 116 as this plate continuously rotates with the power shaft 65. Only the peripheral portion of the plate 131 underlies the arm 116 and this portion has provided thereon a guide rail 145 providing a guide flange 146 and a stop shoulder 147 at its leading end. Fixed on the plate 131 just forwardly from the stop 147 and alongside the flange 146 is a secondary cam 148 having a flat upper face 149 and a bevelled lead face 150.

Fixed to the upper face of plate 131 is an open ended box 152 through which a tightly wound coiled spring 153 extends with the inner end thereof fixed to the shaft 65 so that the spring 152 extends radially from the shaft and is biased so that, when not under restraint it lies against the leading wall 154 of the box 152. Fixed upon the outer end of spring 153 is a cocking arm actuating cam 160 which has a sloping lead face 161 and a horizontal upper face 162 which adjoins a vertical end face 163.

Operation

The conveyor 11 incorporating the above-described embodiment of the classifier 10 of the invention is normally placed in a production line of cannery equipment to receive cans 14 just loaded with the product, one of these cans being caught by each of the pusher arms 25 and impelled along the trackway 13. Each such can is thus pushed onto the platform 34 and if it is an overweight can it depresses this platform enough to cause the unit 30 to function to further depress said platform, whereby this can will engage the diagonal edge 36 and be diverted from the trackway 13 onto the conveyor 47 by which it is conveyed to a station where some of the product is manually removed therefrom to bring its weight within the required tolerance. When the weight of a can 14 thus pushed onto the platform 34 is insufficient to lower this platform to a point which sets the unit 30 into operation to divert said can, this can continues across the platform 34 onto the next adjacent section 170 of the trackway 13. Any can which thus passes over the platform 34 onto the trackway section 170 is either too light or it is within the acceptable tolerance limits for weight. If too light it will fail to depress the platform 35 of the second unit 31 and will be propelled in a straight line across said platform and onto the next adjacent trackway section 171 along which this can will be conveyed by the conveyor 22 until it is finally delivered to a re-weighing station where product will be added to this can to raise the weight of it to where this is within the required weight tolerance.

Each of those cans 14 delivered to the conveyor 22, which have a weight within the required tolerance, pass over the platform 34 and track section 170 onto the platform 35, which this can now slightly depresses so as to actuate the unit 31, causing this unit to further depress the platform 35 and effect a diversion of this can onto the transfer disc 46 and thence onto the conveyor 48 which leads to a station where such cans are capped. As units 30 and 31 are alike in structure and operation and as the unit 31 alone has been illustrated and described in detail, the manner of operation of these units can best be made clear by a description of the operation of unit 31.

Owing to the permanent drive connection through the chain 59 between the conveyor 22 and the units 30 and 31 (Fig. 2) the power shafts 55 and 65 rotate in the same direction and at the same rate of speed so as to make one complete revolution each time the conveyor 22 travels the distance between adjacent pusher arms 25. When there is no can on the platform 35 and spring device 100 is cocked, the counterbalance 76 holds this platform in its uppermost position, contact between the upper end of cup 102 and the shoulders 140 of the frame members 91 limiting the upward movement of the platform 35 to where it lies on the same level with the trackway 13 (Fig. 3).

This is the status of the unit 31 each time an arm 25 pushes a can 14 onto the platform 35 at the beginning of a weighing cycle. Assuming this can to be filled within the required weight tolerance it is heavy enough to slightly depress the platform 35 and lowers the trigger 115 into the path of the leading edge 136 of the trigger actuator 128 which results in a quick rotation of the cup 102 to shift the catch 111 out from under the catch 110 thereby freeing spring 124 from restraint and letting it expand as shown in Fig. 6, shifting the cup 102 upwardly against the shoulders 140 and thus reacting against the shaft 78 to draw this downwardly and depress the platform 35 mounted upon the upper end of this shaft. As the shaft 78 moves downwardly the cocking arm 116 is lowered as shown in Fig. 6 to a level below the upper flat face 162 of the cocking cam 160, and the collar 95 is guided by the conical lower face 96 into the hole 89 in frame arm 88, the lower end of shaft 78 now coming to rest upon stop screw 94.

As previously pointed out the expansion of the spring unit 100 is so rapid that the trigger 115 is immediately lifted upwardly as shown in Fig. 6 so that the actuator 128 readily slides under this trigger.

The firing of the spring device 100 and resultant lowering of the shaft 78 and platform 35 results in the can 14 which effected this, being forthwith diverted from the platform and delivered to that group of cans which come within the required weight tolerance limits. It is next necessary, following the diversion of this can, to re-cock the spring device and to return the platform 35 to the level of the trackway 13 before the end of that operation cycle, which as above indicated will take place when the next pusher arm 25 of conveyor 22 advances to a position where if a can 14 is being propelled thereby, that can will be about to be delivered onto the platform 35.

The restoration of classifier unit 31 to the original condition it was in at the beginning of the current cycle of operation is effected during the final portion of said cycle by the cocking arm actuator 129 rotating with its peripheral portion extending just beneath the cocking arm 116, as shown in Figs. 8, 9, 10 and 11. When the power shaft 65 has rotated about ⅙ of a revolution following the firing of the spring device 100, the cocking cam 160, mounted on the end of the spring 153, is brought into contact with cocking arm 116. This engagement halts rotation of the cam 160 with the sector plate 131 of this actuator, causing cam 160 to remain stationary while the secondary cam 148, which is fixed to the plate 131, continues to rotate with the latter and slides underneath the cam 160 until face 163 of cam 160 comes against the stop shoulder 147 formed on the leading end of the guide track 145 (Fig. 10).

Upon the cam 160 being thus raised onto the cam 148 and engaged by the stop shoulder 147 on the rotating sector plate 131, it immediately resumes rotation with said sector plate with the inclined lead face 161 of cam 160 engaging the bevelled edge 118 of the arm 116 so as to lift this arm, thereby telescoping the lower cup 101 of the spring device 100 upwardly into the upper cup 102 thereof until the catches 110 are shifted above the catches 111 whereby the torque bias of the spring 124 swings the catches 111 into interlocking relation with the catches 110 and slightly spaced downwardly therefrom.

This latter condition occurs as the upper horizontal face 162 of cam 160 passes under the cocking arm 116. As cam 160 passes out from under said arm the catches 110 shift downwardly into interlocking relation with the catches 111 with a vertical movement which is insufficient to lower arm 116 into contact with the guide rail 145 but nevertheless bringing this arm close to said guide rail.

The upward movement imparted to the arm 116 by the cam 160 as above described returns platform 35 upwardly substantially to the same level as the trackway 13 and leaves said platform at said level when arm 116 rides off the upper face 162 of cam 160 to complete the cocking of spring device 100.

The juxtaposition of the arm 116 vertically relative to the guide rail 145 which follows is for the purpose of stabilizing the platform 35 in its normal upward position on the same level with trackway 13. When the rail 145 rotates out from under the cocking arm 116, the classifier unit 31 has been returned to normal and is ready for the initiation of the next operating cycle.

It may be noted that approximately $\frac{7}{12}$ of each operating cycle of unit 31, is available for the reception and weighing of a loaded can 14. At the end of this weighing period, the leading edge 136 of trigger actuator 128 passes under trigger 115, either without actuating it or immediately after actuating it. If the trigger is not actuated, it is because the can 14 travelling across platform 35 is too light to depress trigger 115 into the path of actuator 128. Thus spring device 100 remains as it is, that is unfired throughout this cycle and the actuators 128 and 129 merely sweep idly underneath trigger 115 and cocking arm 116.

Vertical clearance between the arm 116 and cam 160 during such a cycle results from the fact that the spring unit 100 remains cocked and in its uppermost position thus holding arm 116 at its highest level and the fact that cam 160 is automatically shifted forwardly from over fixed cam 148 by the coiled spring 153 at the end of each cycle of operation thereby allowing cam 160 to rest directly on sector plate 131 and well below said level as shown in Figs. 5 and 11.

The claims are:

1. In a machine for classifying articles by weight, the combination of: a trackway along which articles may be propelled; a scales including a counter-balanced platform comprising a section of said trackway and normally disposed on the same level therewith; a conveyor having arms for propelling articles along said trackway and over said platform, the edge of said trackway at the far side of said platform being on a bias relative to the direction of travel of said article along said trackway whereby a substantial depression of said platform causes an article being propelled over said platform to engage said edge and be diverted laterally from said trackway; spring means normally under restraint and connected with said platform to depress the latter when said spring means is released from restraint; cocking means for placing said spring means under restraint; trigger means from restraint for releasing said spring means; and means moving in timed relation with said conveyor and responsive to an article slightly depressing said platform to actuate said trigger means to release said spring means and produce a substantial depression of said platform to divert said article laterally from said trackway and to then actuate said cocking means to place said spring means under restraint again before said conveyor delivers another article onto said platform.

2. In a machine for classifying articles by weight, the combination of: a trackway along which articles may be propelled; a scales including a counter-balanced platform comprising a section of said trackway and normally disposed on the same level therewith; a conveyor having arms for propelling articles along said trackway and over said platform, the edge of said trackway at the far side of said platform being on a bias relative to the direction of travel of said articles along said trackway whereby substantial depression of said platform causes an article being propelled over said platform to engage said edge and be diverted laterally from said trackway; spring means normally under restraint and connected with said platform to depress the latter when said spring means is released from restraint; cocking means adapted when power actuated to place said spring under restraint; trigger means balanced with said scales platform and shiftable by vertical movements of the latter between operative and inoperative positions; power means driven in timed relation with said conveyor to engage said trigger means whenever said trigger means is shifted into operative position by an article slightly depressing said platform, said trigger means, when so engaged, releasing said spring means and causing the latter to depress said platform, whereby said trackway edge diverts said article, said power means then engaging said cocking means to place said spring means again under restraint, after said article has been diverted, and to elevate said platform to the level of said trackway.

3. In a machine for classifying articles by weight, the combination of: a trackway along which articles may be propelled; a scales including a counter-balanced platform comprising a section of said trackway and normally disposed on the same level therewith; a conveyor having arms for propelling articles along said trackway and over said platform, the edge of said trackway at the far side of said platform being on a bias relative to the direction of travel of said articles along said trackway whereby substantial depression of said platform causes an article being propelled over said platform to engage said edge and be diverted laterally from said trackway; a spring device, including a spring, spring catch means for holding said spring in inoperative restraint, a catch releasing trigger, and a cocking arm, said device being connected to and balanced with said platform in said scales; and power means carrying a trigger actuator and a cocking arm actuator driven in timed relation with said conveyor along a path in which said trigger actuator engages and actuates said trigger, when the latter has been shifted slightly by the lowering of said platform, to release said spring to urge said platform downwardly, said cocking arm thus also being brought into operative relation with said cocking arm actuator whereby said cocking arm is subsequently actuated to compress said spring again and re-engage said catch means to retain said spring in a condition of inoperative restraint.

4. A combination as in claim 3 in which said spring device is mounted on a vertical shaft, the upper end of which connects with said scales and with said platform so as to move vertically coordinately with the vertical movement of said platform, said spring device shifting said shaft vertically to depress said platform.

5. A combination as in claim 4 in which said spring device includes a pair of cups placed face to face in telescopic relation, one of said cups being fixed on said shaft and the other being slidable thereon, said catch means comprising interlocking latches on said cups, said spring being enclosed by said cups and connected at its opposite ends to said cups to urge said cups apart and to urge said latches rotatively into latching relation when said cups are telescoped together; and a stationary stop shoulder against which said free cup is adapted to rest when said platform is level with said trackway and said spring device is cocked by the engagement of said latches, said free cup being urged against said shoulder by said spring when said latches are disengaged by rotation of said free cup relative to said fixed cup, said trigger being provided on said free cup, said cocking arm being provided on said cup which is fixed on said shaft, said power means including a power shaft on which said trigger actuator and cocking arm actuator are fixed to rotate therewith in timed relation with said conveyor, said actuators being rotated in paths which by-pass said trigger and said arm when said platform is on the same level as said trackway, a slight depression of said platform from said position shifting said trigger into the path of said trigger actuator and causing the actuation of said trigger whereby a substantial depression of said platform is effected by said spring, the consequent downward shifting of said shaft bringing said arm within the path of said cocking arm actuator, the latter comprising a cam, which transmits axial movement through said arm and said fixed cup to said shaft, and telescopes said two cups until said latches interlock, said axial movement of said shaft returning said platform to the level of said trackway.

6. A combination as in claim 5 in which said trigger actuator includes a sector plate, fixed on said power shaft, the leading edge of said sector plate engaging said trigger when said platform is slightly depressed, the resulting expansion of said spring moving said free cup into contact with said stop shoulder and shifting said trigger clear of said sector plate so that said trigger is by-passed by the latter, and in which said cocking arm actuator includes a second sector plate fixed on said power shaft; yieldable means for normally positioning said cam so as to rest on said second sector plate and thereby travel in a path which causes said cam to by-pass said cocking arm when said device is cocked and said platform is on the same level with said trackway, said arm being moved into said path however, when said trigger is actuated to depress said platform; and a second cam carried on said second sector plate whereby engagement of said cocking arm with said actuator cam, following the firing of said spring device, shifts said actuator cam onto said second cam; and a stop on said second sector plate for halting movement of said actuator cam relative to said second cam when superimposed upon the latter as aforesaid whereby said cocking arm follows the contour of said actuator cam, with the latter in its elevated position, to shift said fixed cup and shaft axially to re-cock said spring device as aforesaid and return said platform to the level of said trackway.

ALBERT HORNER.
PAUL E. STORY.

References Cited in the file of this patent
UNITED STATES PATENTS

| Number | Name | Date |
| --- | --- | --- |
| 1,784,540 | Ripley | Dec. 9, 1930 |
| 1,932,985 | Perkins | Oct. 31, 1933 |
| 2,266,807 | Rooney | Dec. 23, 1941 |